United States Patent
Kumkar et al.

(10) Patent No.: US 12,032,183 B2
(45) Date of Patent: Jul. 9, 2024

(54) SPATIAL FREQUENCY FILTER DEVICE FOR USE WITH A LASER BEAM, SPATIAL FREQUENCY FILTER ASSEMBLY HAVING SUCH A SPATIAL FREQUENCY FILTER DEVICE, AND METHOD FOR SPATIAL FREQUENCY FILTERING OF A LASER BEAM

(71) Applicant: TRUMPF Laser- und Systemtechnik GmbH, Ditzingen (DE)

(72) Inventors: Malte Kumkar, Weimar (DE); Stefan Doerr, Bietigheim-Bissingen (DE); Daniel Flamm, Ludwigsburg (DE)

(73) Assignee: TRUMPF LASER—UND SYSTEMTECHNIK GMBH, Ditzingen (DE)

( * ) Notice: Subject to any disclaimer, the term of this patent is extended or adjusted under 35 U.S.C. 154(b) by 457 days.

(21) Appl. No.: 17/500,962

(22) Filed: Oct. 14, 2021

(65) Prior Publication Data

US 2022/0035083 A1 Feb. 3, 2022

Related U.S. Application Data

(63) Continuation of application No. PCT/EP2020/060704, filed on Apr. 16, 2020.

(30) Foreign Application Priority Data

Apr. 17, 2019 (DE) ...................... 10 2019 205 642.3

(51) Int. Cl.
*G02B 5/18* (2006.01)
*B23K 26/06* (2014.01)
(Continued)

(52) U.S. Cl.
CPC ........ *G02B 5/1814* (2013.01); *B23K 26/0652* (2013.01); *G02B 5/20* (2013.01); *G02B 27/0944* (2013.01); *G02B 27/0988* (2013.01)

(58) Field of Classification Search
CPC .... G02B 5/1814; G02B 5/20; G02B 27/0944; G02B 27/0988; B23K 26/0652
(Continued)

(56) References Cited

U.S. PATENT DOCUMENTS 5,754,512 A * 5/1998 Komma ............... G11B 7/1378
369/112.25
7,173,761 B2 2/2007 Yoshida
(Continued)

FOREIGN PATENT DOCUMENTS

CN 1338733 A 3/2002
CN 1707312 A 12/2005
(Continued)

OTHER PUBLICATIONS

Solak, et al., "Patterning of circular Structure Arrays with Interference Lithography," *Journal of Vacuum Science & Technology B: Microelectronicsprocessing and Phenomena* 21, 6, Nov. 2003, pp. 2883-2887, American Vacuum Society, New York. USA.
(Continued)

*Primary Examiner* — Wyatt A Stoffa
*Assistant Examiner* — Mitchell T Oestreich
(74) *Attorney, Agent, or Firm* — LEYDIG VOIT & MAYER LTD.

(57) ABSTRACT

A spatial frequency filter device is for use with a laser beam. The device includes: a neutral region, which is configured to transmit or reflect the laser beam; and a deflecting region, which radially adjoins the neutral region and is configured to deflect beam components of the laser beam from a beam axis of the laser beam. The deflecting region has a constant
(Continued)

portion, in which a deflecting effect on the beam components of the laser beam for each location in the constant portion is configured to be independent of a distance of a location from the neutral region. the deflecting region has a variation portion, in which the deflecting effect on the beam components of the laser beam is configured to vary, dependent on a distance from the neutral region.

16 Claims, 3 Drawing Sheets

(51) Int. Cl.
    *G02B 5/20*     (2006.01)
    *G02B 27/09*     (2006.01)

(58) Field of Classification Search
    USPC ............................................................ 359/568
    See application file for complete search history.

(56) References Cited

U.S. PATENT DOCUMENTS

| | | |
|---|---|---|
| 2005/0185300 A1 | 8/2005 | Kittelmann et al. |
| 2014/0078468 A1 | 3/2014 | Bublitz et al. |
| 2018/0074232 A1 | 3/2018 | Dross |
| 2022/0035083 A1 | 2/2022 | Kumkar et al. |

FOREIGN PATENT DOCUMENTS

| | | |
|---|---|---|
| CN | 1918427 A | 2/2007 |
| CN | 104335276 A | 2/2015 |
| CN | 107533157 A | 1/2018 |
| CN | 113748364 A | 12/2021 |
| DE | 3806879 C1 | 3/1989 |
| DE | 102004058044 A1 | 6/2006 |
| DE | 102007009661 A1 | 3/2008 |
| DE | 102011102355 A1 | 11/2012 |
| JP | 2008089753 A | 4/2008 |
| KR | 100283502 B1 | 3/2001 |
| KR | 20040104534 A | 12/2004 |
| WO | WO 02052332 A2 | 7/2002 |
| WO | WO 2006058749 A1 | 6/2006 |

OTHER PUBLICATIONS

Eckstein, et al., "Comparison of Different Simulation Methods for Effective Medium Computer Generated Holograms," May 2013, *Optics Express* 21, 10, pp. 12424-12433, The Optical Society, Washington D.C., USA.

Farn, "Binary Gratings with Increased Efficiency," *Applied Optics* 31, 22, Aug. 1992, pp. 4453-4458, The Optical Society, Washington D.C., USA.

Ngcobo, et al., "A Digital Laser for On-Demand Laser Modes," *Nature Communications* 4, Aug. 2013, pp. 1-6, Nature Research, London, UK.

* cited by examiner

SPATIAL FREQUENCY FILTER DEVICE FOR USE WITH A LASER BEAM, SPATIAL FREQUENCY FILTER ASSEMBLY HAVING SUCH A SPATIAL FREQUENCY FILTER DEVICE, AND METHOD FOR SPATIAL FREQUENCY FILTERING OF A LASER BEAM

CROSS REFERENCE TO RELATED APPLICATIONS

This application is a continuation of International Application No. PCT/EP2020/060704 (WO 2020/212487 A1), filed on Apr. 16, 2020, and claims benefit to German Patent Application No. DE 10 2019 205 642.3, filed on Apr. 17, 2019. The aforementioned applications are hereby incorporated by reference herein.

FIELD

The present invention relates to a spatial frequency filter device for use with a laser beam, to a spatial frequency filter assembly for a laser beam, and to a method for spatial frequency filtering of a laser beam.

BACKGROUND

German laid-open patent application DE 10 2004 058 044 A1 discloses a spatial frequency filter device for spatial frequency filtering of laser beams which has a transmission body, which is at least partially transparent to the laser radiation, and an element which has an aperture and is arranged adjacent to the transmission body or is integrated in the transmission body, the element having a diffractive and/or refractive deflecting structure. By means of such a diffractive stop, undesired light components of a laser beam are deliberately diffracted into well-defined solid angles, where they can be efficiently absorbed. Such a diffractive stop or aperture stop may, for example, provide at the exit of a transporting fiber for laser radiation a limitation of the bundle leaving the transporting fiber and protect downstream components. The diffractive region of such a stop avoids peripheral fields interacting with the respective geometry of the stop, in particular with peripheral regions of the stop that are otherwise not optimum for production reasons and could influence the propagation behavior of the used beam. In the case of aperture stops without a diffractive region, virtual sources with undesired directions of propagation may occur, with adverse effects on downstream optics or a workpiece to be processed.

While this is avoided with a diffractive stop such as that known from DE 10 2004 058 044 A1, it is only possible with difficulty or not possible at all for it to be used to filter undesired beam components that are overlaid on a main beam or used beam. The present inventors have recognized that this proves to be all the more difficult the more these undesired beam components overlap with the actual used beam or main beam.

SUMMARY

In an embodiment, the present disclosure provides a spatial frequency filter device that is for use with a laser beam. The device includes: a neutral region, which is configured to transmit or reflect the laser beam; and a deflecting region, which radially adjoins the neutral region and is configured to deflect beam components of the laser beam from a beam axis of the laser beam. The deflecting region has a constant portion, in which a deflecting effect on the beam components of the laser beam for each location in the constant portion is configured to be independent of a distance of a location from the neutral region. The deflecting region has a variation portion, in which the deflecting effect on the beam components of the laser beam is configured to vary, dependent on a distance from the neutral region.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
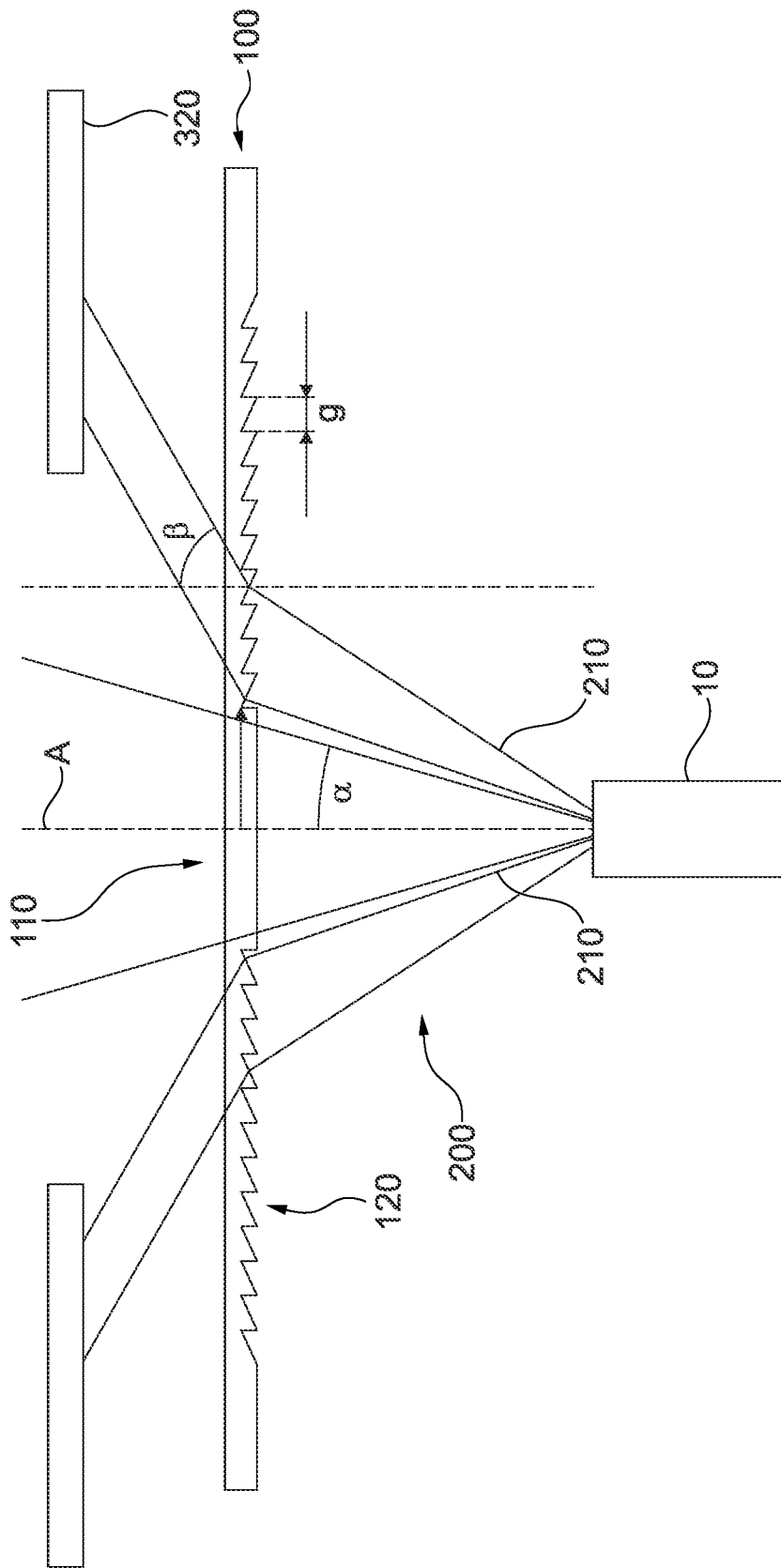
FIG. 1 shows a schematic representation of a spatial frequency filter device according to the prior art.

The present invention invention provides a spatial frequency filter device, a spatial frequency filter assembly, and also a method for spatial frequency filtering of a laser beam, with which the disadvantages mentioned do not occur.

An embodiment of the present invention provides a spatial frequency filter device for use with a laser beam which has a neutral region, which is designed to transmit or reflect the laser beam. The spatial frequency filter device has a deflecting region, which radially adjoins the neutral region and is designed to deflect beam components of the laser beam from a beam axis of the laser beam. The deflecting region has a constant portion, in which a deflecting effect on the beam components of the laser beam for each location in the constant portion is independent of a distance of the location from the neutral region. The deflecting region also has a variation portion, in which the deflecting effect on the beam components of the laser beam varies, dependent on a distance from the neutral region. With the constant portion of the deflecting region, it is possible to reliably and effectively deflect, and consequently filter, undesired beam components sufficiently separated from the main beam or used beam. The variation portion of the deflecting region on the other hand allows filtering, e.g., gradual filtering, of undesired beam components that are arranged very close to the main beam or used beam or overlap with it, without thereby adversely influencing or excessively cutting into the main beam or used beam. Therefore, the spatial frequency filter device described here provides an improved possibility for filtering a laser beam, and in particular also for removing undesired beam components that are overlaid on the main beam or used beam.

The neutral region is a region of the spatial frequency filter device in which the laser beam is transmitted or reflected undisturbed, without deflection of beam components of the laser beam from the beam axis. The neutral region transmits or reflects the laser beam undisturbed.

A radial direction is understood here as meaning a direction that is perpendicular to the beam axis. The beam axis is a propagation axis of the laser beam. It accordingly refers to a direction of propagation of the laser beam or extends in the direction of propagation of the laser beam. The beam axis is an axis which coincides with the Poynting vector of the laser beam.

That the effect varies in the variation portion means that a deflection efficiency, in particular a strength of a phase modulation, varies location-dependently in the variation portion. On the other hand, a deflecting direction or a deflecting angle is/are preferably constant even in the variation portion.

That the deflecting effect on the beam components of the laser beam for each location in the constant portion is independent of a distance of the location from the neutral region means that in the constant portion there is a constant deflecting effect that is not location-dependent. Accordingly, in the constant portion, both the deflecting angle or the deflecting direction and the strength or intensity of the deflection are location-independent, and consequently constant.

That the deflecting effect varies in the variation portion, dependent on a distance from the neutral region, means in particular that locations of the variation portion that are at an equal distance from the neutral region have an equal deflecting effect, in particular an equal strength of the deflection. Locations that are at different distances from the neutral region on the other hand preferably have a different deflecting effect, in particular a different strength of the deflection.

The distance of a location in the variation portion from the neutral region is preferably measured perpendicularly to an imaginary or real dividing line between the variation portion and the neutral region. In this case, the distance is measured dependent on a form or geometry of the imaginary or real dividing line or of the neutral region. If, for example, the neutral region is circular, the distance is preferably measured radially in relation to the circular neutral region. If, on the other hand, the neutral region is, for example, of a rectangular form, the distance is preferably measured in each case perpendicularly to a delimiting edge of the neutral region.

The neutral region may be formed as circular, elliptical or oval, or rectangular, or be formed with any other geometry. It is preferably adapted to the cross-sectional geometry of a laser beam to be filtered. The form of the deflecting region preferably corresponds to the form of the neutral region. This applies in particular both to the constant portion and to the variation portion.

According to a preferred configuration, the variation portion is arranged between the neutral region on the one hand and the constant portion on the other hand. In an advantageous way, there is consequently a transition in the deflecting effect from the neutral region to the constant portion, in particular a transition from 0% deflecting effect in the neutral region to 100% deflecting effect in the constant portion, preferably a continuous or steady transition, in particular a linear or Gaussian-shaped transition—in particular in the form of a half Gaussian function. In this way, undesired beam components that are overlaid on the main beam or used beam can be filtered, without thereby excessively impairing or cutting into the main beam or used beam.

According to a preferred configuration, the deflecting region is adjoined by a blocking-out region, in which the laser beam is absorbed. In this way, beam components outside the beam to be filtered can be blocked out.

According to an embodiment of the invention, it is provided that the neutral region is arranged centrally and is surrounded by the deflecting region on the outside, for example radially outside. In this case, the variation portion is arranged—radially—between the neutral region and the constant portion. The neutral region may accordingly be a central neutral region, which is adjoined radially outside by the deflecting region, which preferably has the constant portion as an outer constant portion and the variation portion as an inner variation portion. Accordingly, seen in the radial direction, first the neutral region, then the variation portion and finally the constant portion follow one another from radially inside to radially outside. This represents a particularly simple configuration of the spatial frequency filter device.

Alternatively, it is possible that the neutral region is arranged radially outside and is adjoined by the deflecting region radially inside, here too the variation portion being arranged between the neutral region and the constant portion. In this case, the constant portion may be a central constant portion, which is adjoined radially outside by the variation portion, which in turn is adjoined radially further outside by the neutral region. Such a configuration, which is almost the inverse of the configuration described above, also represents a very suitable possibility for filtering a laser beam.

According to an embodiment of the invention, it is provided that in the variation portion the deflecting effect on the beam components of the laser beam increases with increasing distance from the neutral region. This is—as already indicated—particularly advantageous because it allows undesired beam components that are overlaid on the main beam or used beam to be filtered in a particularly suitable way, without excessively impairing the main beam or used beam itself, while in particular avoiding, or at least reducing, undesired effects such as diffraction at edges. As likewise already stated, in the variation portion the deflecting effect increases from the neutral region to the constant portion, preferably from 0% at the boundary or in the transitional region to the neutral region to 100% at the boundary or in the transitional region to the constant portion. In this case, the value of 0% corresponds to the deflecting effect that there is in the neutral region, preferably therefore no deflecting effect, while the value of 100% corresponds to the deflecting effect that there is in the constant portion. Particularly preferably, in the variation portion, the deflecting effect increases continuously or steadily, most particularly preferably linearly, with increasing distance from the neutral region.

According to an embodiment of the invention, it is provided that the deflecting region has a phase influencing structure. Preferably, an amplitude of the laser radiation is not influenced in the deflecting region. In a preferred configuration, the deflecting region consequently acts exclusively on the phase of the laser radiation. The phase influencing structure is preferably constant in the constant portion, while in the variation portion it varies location-dependently, in particular dependent on the distance from the neutral region, with respect to at least one property. Suitable phase influencing structures are disclosed, for example, by Farn, M. W. Binary gratings with increased efficiency. *Appl. Opt.* 31(22), 4453-4458 (1992); Ngcobo, S. et al. A digital laser for on-demand laser modes. *Nat. Commun.* 4:2289 doi: 10.1038/ncomms3289 (2013); Eckstein W. et al. Comparison of different simulation methods for effective medium computer generated holograms. *Opt. Express* 21(10), 12424-12433 (2013).

According to an embodiment of the invention, it is provided that the phase influencing structure is formed as a diffractive deflecting structure. The diffractive deflecting structure is periodic with a specific, preferably constant modulation period and has in the constant region a constant modulation amplitude, the modulation period and the modulation amplitude determining the phase influencing of the laser radiation by the diffractive deflecting structure. In particular, the modulation amplitude determines a strength of the phase influencing, which is also referred to as phase modulation. In the variation portion, the modulation amplitude of the diffractive deflecting structure varies.

According to a preferred configuration, the diffractive deflecting structure is formed as a geometric grating. The modulation amplitude of the diffractive deflecting structure is understood in this case as meaning a geometrical height or depth of the diffractive deflecting structure—preferably measured along the beam axis. The modulation amplitude is then a grating height of the geometric grating.

According to another preferred configuration, the diffractive deflecting structure is formed by a local, in particular spatial, variation of a refractive index. Particularly preferably, the diffractive deflecting structure is formed as a volume grating.

The modulation period may be the period length of the diffractive deflecting structure, measured perpendicularly to the beam axis, that is to say in the radial direction. The modulation period is preferably constant both in the constant portion and in the variation portion, in particular the same in the constant portion and in the variation portion.

According to an embodiment of the invention, it is provided that the deflecting effect on the beam components of the laser beam varies in the variation portion according to a specific function of the distance from the neutral region. In this way, the deflecting effect, and consequently the overall behavior of the spatial frequency filter device, can be advantageously influenced in a well-defined way. As already stated, a preferred configuration of such a variation of the deflecting effect represents a linear function. However, according to another configuration, it is also possible that the specific function is a Gaussian function. Other specific functions are also possible.

According to an embodiment of the invention, it is provided that the spatial frequency filter device has a filter body, on which the neutral region is formed. The deflecting region is applied to or incorporated in the filter body. This represents a configuration of the spatial frequency filter device that is particularly easy to provide and at the same time is very effective. The filter body may be a substrate, preferably of a material formed as transmissive or reflective to the laser radiation. In particular, the diffractive deflecting structure may preferably be applied to the filter body or incorporated in the filter body. In particular, the deflecting region/the diffractive deflecting structure may preferably be produced by local modification, for example structuring, of the filter body, in particular of the material of the filter body.

According to an embodiment of the invention, it is provided that the neutral region has a neutral width dimension. The neutral width dimension may be a half width dimension, that is to say a dimension which indicates a half width, or a ring width, for example a radius.

The neutral width dimension is preferably from at least 5% to at most 130% of a beam width dimension of a laser beam to be filtered.

The beam width dimension of the laser beam to be filtered is in this case preferably likewise a half width dimension, e.g., a radius. In the case of a Gaussian-shaped laser beam, the beam width dimension is preferably measured here from the beam axis to a location at which the laser radiation has fallen to a fraction of $1/e^2$ of the maximum intensity on the beam axis.

According to a preferred configuration, the neutral width dimension is preferably from at least 20% to at most 60% of the beam width dimension. This range of values has proven to be particularly advantageous for the filtering of undesired beam components that overlap with the main beam or used beam.

According to another preferred configuration, the neutral width dimension is preferably from at least 60% to at most 100% of the beam width dimension. This range of values has proven to be particularly advantageous for the filtering of undesired beam components that do not overlap, or only overlap to a slight extent, with the main beam or used beam.

Alternatively or additionally, the variation portion preferably has a variation width dimension. The variation width dimension may likewise be a half width dimension or a ring width, e.g., a radius. The variation width dimension is preferably from at least 10% to at most 150% of the neutral width dimension.

According to a preferred configuration, the variation width dimension is from at least 10% to at most 40%, preferably 30%, of the neutral width dimension. This has proven to be particularly advantageous for the filtering of undesired beam components that overlap only slightly or do not overlap with the main beam or used beam.

According to another preferred configuration, the variation width dimension is from at least 40% to at most 150%, preferably 100%, of the neutral width dimension. This configuration has proven to be particularly advantageous for the filtering of undesired beam components that overlap with the main beam or used beam.

If a region is formed in the shape of a ring, the corresponding width dimension is preferably a ring width, that is to say a full width of the ring, measured in a defined direction perpendicular to delimiting lines of the ring, therefore as it were a radial portion of the outer radius of the ring that is made up by the surface area of the ring.

According to an embodiment of the invention, it is provided that the spatial frequency filter device is formed as a transmission stop, as a lens, as a protective glass, as a fiber end cap or as a mirror. These represent particularly suitable configurations of the spatial frequency filter device.

According to an embodiment of the invention, it is provided that the diffractive deflecting structure is formed such that no zero diffraction order, that is to say no diffraction of zero order, is produced. Consequently, undesired beam components are deflected as completely as possible from the beam axis.

The diffractive deflecting structure is preferably formed such that it exclusively produces a first diffraction order, that is to say exclusively diffraction of the first order. Consequently, undesired beam components are deflected into a well-defined solid angle, where they can be easily and accurately filtered out.

According to a preferred configuration, the diffractive deflecting structure has a blazed grating or is formed as a blazed grating. This represents a configuration of the diffractive deflecting structure that is as simple as it is functional.

According to an embodiment of the invention, it is provided that the diffractive deflecting structure is etched into the filter body. In this way, the diffractive deflecting structure can be produced very easily and with great accuracy.

Alternatively, the diffractive deflecting structure is preferably incorporated in the filter body as a volume modification, e.g., as a volume grating. In this way, modifications can be produced with great accuracy in the volume of the filter body, e.g., of the substrate, ultimately resulting in regions of different refractive indices, which act diffractively.

The object is also achieved by providing a spatial frequency filter assembly for a laser beam which has a spatial frequency filter device according to the invention or a spatial frequency filter device according to one of the exemplary embodiments described above. Furthermore, the spatial frequency filter assembly has a constant filter device. With the aid of the constant filter device, the undesired beam components deflected by the spatial frequency filter device can be filtered out, particularly preferably blocked out, in particular absorbed. In particular the advantages that have been explained in connection with the spatial frequency filter device are obtained in connection with the spatial frequency filter assembly.

A constant filter device is understood here as meaning a device which just has on the one hand a neutral region and on the other hand a blocking-out region adjoining the neutral region. It is possible in this case that the neutral region is formed as a central neutral region which is surrounded by the blocking-out region radially outside. However, an inverse arrangement, in which the neutral region surrounds the central blocking-out region radially outside, is also possible. The neutral region in this case transmits or reflects the laser radiation as undisturbed as possible, preferably completely undisturbed, while the blocking-out region preferably neither transmits nor reflects the laser radiation, preferably absorbs it. The constant filter device consequently in particular does not have a deflecting region, in particular has neither a constant portion nor a variation portion.

The constant filter device is preferably formed as a stop, in particular as an aperture stop.

According to a preferred configuration, the constant filter device is arranged downstream of the spatial frequency filter device, seen in the direction of beam propagation of the laser beam.

For example, the constant filter device is preferably arranged spaced apart from the spatial frequency filter device, preferably by a specific propagation distance. Beam components deflected by the deflecting region of the spatial frequency filter device are then advantageously blocked out by the constant filter device, because they propagate with an increased angle of divergence in comparison with the desired main beam or used beam, and so are sufficiently spatially separated from the main beam or used beam after the specific propagation distance, and consequently can be eliminated, in particular absorbed, by the constant filter device.

The spatial frequency filter assembly is in this way designed in particular for amplitude filtering of the laser beam.

According to an embodiment of the invention, it is provided that the spatial frequency filter assembly has a first converging lens, which is arranged downstream of the spatial frequency filter device in the direction of beam propagation of the laser beam. With the aid of the converging lens, the laser radiation filtered by the spatial frequency filter device can be influenced in an advantageous way. Preferably, the first converging lens is arranged upstream of the constant filter device, seen in the direction of beam propagation of the laser beam. In this way, the laser radiation can be imaged by means of the first converging lens in particular onto the constant filter device, in order to bring about particularly effective filtering.

Alternatively, it is possible that the constant filter device is integrated in the first converging lens, or that the first converging lens is formed as a constant filter device. For example, the first converging lens may be formed as opaque, or restricted in its lens effect, in a radially outer region; or the lens effect is nullified in the radially outer region; or the first converging lens is arranged in a housing, the housing forming the blocking-out region. The first converging lens may also be surrounded by a cooled absorber, or arranged on a cooled absorber, which provides the blocking-out region.

According to an embodiment of the invention, it is provided that the spatial frequency filter device has—as an alternative or in addition to the first converging lens—a second converging lens, which is arranged upstream of the spatial frequency filter device in the direction of beam propagation of the laser beam. This second converging lens may advantageously expand the laser beam upstream of the spatial frequency filter device. This proves to be advantageous in particular if the laser beam has a very small beam diameter, and so in fact—without the second converging lens—very small structure sizes would be necessary for the spatial frequency filter device. If the laser beam is in this case expanded, the spatial frequency filter device can have correspondingly larger structures, and so can be produced more easily and at lower cost. It is consequently advantageous to provide the second converging lens if the laser radiation leaves or is coupled out from a fiber bundle, and therefore has a particularly small beam diameter. Generally, the beam width dimension can be adapted to an outside diameter of the spatial frequency filter device, for example made smaller or larger, by means of the second converging lens. This also proves to be advantageous if the beam diameter is greater than the outside diameter of the spatial frequency filter device.

Alternatively or additionally, the spatial frequency filter device preferably has a third converging lens, which is arranged downstream of the constant filter device in the direction of beam propagation of the laser beam. This may serve—separately or else in combination with the first converging lens and the second converging lens—for influencing, in particular shaping, the laser beam at the outlet of the spatial frequency filter assembly for downstream elements or a workpiece to be processed. In particular, the laser beam may be collimated by the third converging lens.

According to a particularly preferred configuration, the spatial frequency filter assembly has a so-called 4f arrangement, where 4f stands for four focal lengths. In the case of such a setup, in particular the following elements are arranged one behind the other—in the direction of beam propagation—in the sequence specified. The spatial frequency filter device, the first converging lens, the constant filter device, and the third converging lens. In this case, the constant filter device on the one hand, and the spatial frequency filter device on the other hand, are preferably respectively arranged at the focus of the first converging lens, while preferably the constant filter device additionally is arranged at the focus of the third converging lens. With such an arrangement, the laser radiation can be filtered particularly well and preferably at the same time collimated.

It is possible that, with such a 4f arrangement, the second converging lens is arranged upstream of the spatial frequency filter device in the direction of beam propagation. It is also possible however that the spatial frequency filter assembly in this preferred configuration has no second converging lens.

The object is finally also achieved by providing a method for spatial frequency filtering of the laser beam, a neutral region of a spatial frequency filter device being passed through by the laser beam, or the laser beam being reflected by the neutral region of the spatial frequency filter device. Beam components of the laser beam are deflected from a beam axis of the laser beam in a deflecting region radially adjoining the neutral region. In a constant portion of the deflecting region, the beam components are deflected with a constant deflecting effect independently of a distance from the neutral region. In a variation portion of the deflecting region—in particular arranged between the neutral region and the constant portion—the beam components are deflected with a varying deflecting effect in dependence on a distance from the neutral region. Particularly preferably, in the variation portion the beam components are deflected with a deflecting effect that increases with increasing distance from the neutral region in dependence on the distance from the neutral region.

In particular the advantages that have already been explained in connection with the spatial frequency filter device and the spatial frequency filter assembly are obtained in connection with the method.

In a preferred configuration, a spatial frequency filter device according to the invention or a spatial frequency filter device according to one of the exemplary embodiments described above is used in the context of the method. Alternatively or additionally, a spatial frequency filter assembly according to the invention or a spatial frequency filter assembly according to one of the exemplary embodiments described above is used in the context of the method. In particular, the advantages already described are thereby obtained.

According to an embodiment of the invention, it is provided that the deflecting region has a diffractive deflecting structure. In this case, a zero diffraction order is preferably suppressed by the diffractive deflecting structure. Particularly preferably, a first diffractive order is exclusively produced by the first diffractive deflecting structure.

According to an embodiment of the invention, it is provided that the beam components deflected in the deflecting region are deflected away from the beam axis of the laser beam by a deflecting angle which is obtained as the arc sine of the quotient of a wavelength of the laser radiation divided by a modulation period of the deflecting region, in particular a modulation period of the diffractive deflecting structure, in particular in accordance with the following formula:

$$\theta = \sin^{-1}\left(\frac{\lambda}{g}\right). \quad (1)$$

Here, $\theta$ is the deflecting angle, $\lambda$ is the wavelength of the laser radiation, and g is the modulation period of the deflecting region. Preferably, the deflecting angle is obtained approximately as the quotient of the wavelength of the laser radiation and the modulation period, in particular in accordance with the following formula:

$$\theta \approx \frac{\lambda}{g}. \quad (2)$$

If, for example, the modulation period is 10 μm, the deflecting angle for infrared radiation is approximately 5.7°. For green light, it is approximately half.

Preferably, beam components deflected by the deflecting region of the spatial frequency filter device are eliminated, in particular absorbed, by a constant filter device arranged spaced apart from the spatial frequency filter device, preferably by a specific propagation distance.

In this way, in particular amplitude filtering of the laser beam is carried out.

FIG. 1 shows a schematic representation of a spatial frequency filter device 100 according to the prior art. The spatial frequency filter device 100 is designed for use with a laser beam 200, which here, by way of example, is coupled out from a fiber or a fiber bundle 10. Here, the laser beam 200 is a divergent laser beam. However, it is equally also possible to use such a spatial frequency filter device 100 with a collimated laser beam 200.

The spatial frequency filter device 100 has a neutral region 110, which is designed here to transmit the laser beam 200. The neutral region 110 may however also be designed to reflect the laser beam 200.

The neutral region 110 is adjoined by a deflecting region 120, which is designed to deflect beam components 210 of the laser beam 200 from a beam axis A of the laser beam 200. This produces an overall deflecting angle β comprising here on the one hand a deflecting angle θ determined by the deflecting region 120 and on the other hand an opening angle α of the divergent laser beam 200. If the laser beam 200 is formed as a collimated laser beam, it is only deflected by the deflecting region 120 by the deflecting angle θ. Beam components 210 deflected by the deflecting region 120 are then blocked out by a constant filter device 320. This is possible because they propagate with an increased angle of divergence in comparison with the desired main beam or used beam, and so are sufficiently spatially separated from the main beam or used beam after a certain propagation distance, and consequently can be eliminated by the constant filter device 320, in particular by a conventional absorption element.

In the case of the spatial frequency filter device 100 known from the prior art, the deflecting effect of the deflecting region 120 is location-independent, that is to say is constant everywhere in the deflecting region 120.

Figure 2:
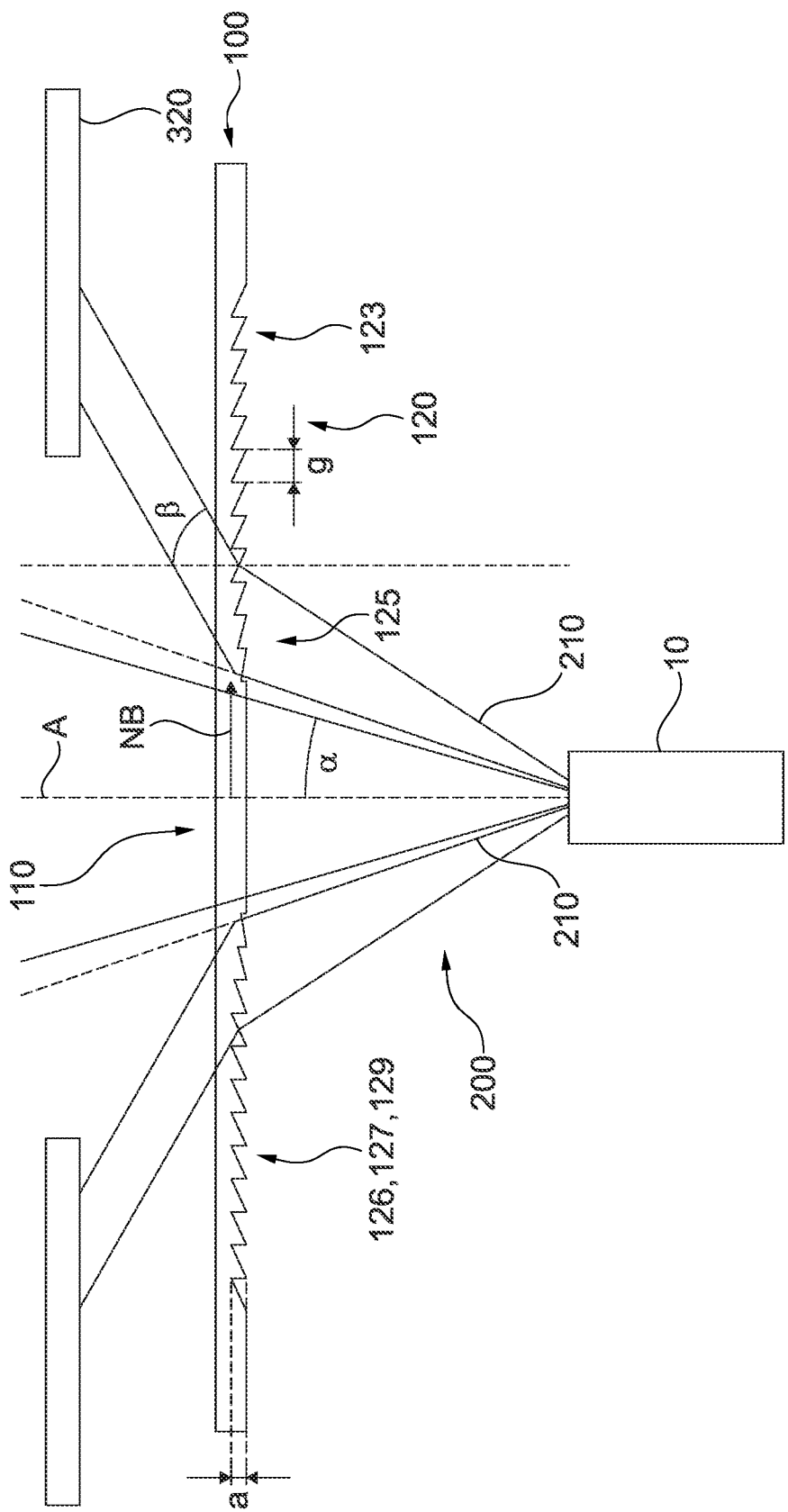
FIG. 2 shows a schematic representation of an exemplary embodiment according to the invention of a spatial frequency filter device.

FIG. 2 shows a schematic representation of an exemplary embodiment of a spatial frequency filter device 100. Elements that are the same or functionally the same are provided with the same designations in all of the figures, and so to this extent reference is respectively made to the foregoing description. The spatial frequency filter device 100 differs from the known spatial frequency filter device 100 according to FIG. 1, for example, in that, here, the deflecting region 120 has in addition to a constant portion 123, in which a deflecting effect on the beam components 210 of the laser beam 200 for each location in the constant portion 123 is independent of a distance of the location from the neutral region 110, a variation portion 125, in which the deflecting effect on the beam components 210 of the laser beam 200 varies, dependent on a distance from the neutral region 110. In this way, it is possible in particular to filter out even those beam components 210 that are arranged close to the main beam or used beam or overlap with the main beam or used beam, without the main beam or used beam being inappropriately impaired or adversely influenced thereby. The variation of the deflecting effect in this case concerns in particular a deflecting efficiency, in particular a strength of a phase modulation. By contrast, the deflecting angle is preferably constant location-independently, and in particular is the same in the constant portion 123 and the variation portion 125.

The variation portion 125 is arranged in particular between the neutral region 110 and the constant portion 123.

In the case of the exemplary embodiment shown here, the neutral region 110 is arranged centrally, the deflecting region 120 radially adjoining the neutral region 110. The deflecting region 120 has in this case the constant portion 123 as an outer constant portion and the variation portion 125 as an inner variation portion, the variation portion 125 adjoining the neutral region 110 radially inside, while the constant portion 123 adjoins the variation portion 125 radially outside. Preferably, the various regions/portions are formed as circular, the variation portion 125 preferably surrounding the central neutral region 110 in the form of a ring, and the constant portion 123 in turn surrounding the variation portion 125 in the form of a ring radially outside, and so the variation portion 125 is arranged as an annular region between the neutral region 110, which is formed in particular in the form of a circular disk, and the annular constant portion 123, which is formed as an outer ring.

Also possible, however, is an inverse configuration, in which the constant portion 123 of the deflecting region 120 is arranged centrally and is then directly adjoined radially outside by the variation portion 125, and that in turn is adjoined radially outside by the then outer neutral region 110.

In the variation portion 125, the deflecting effect on the beam components 210 of the laser beam 200 preferably increases with increasing distance from the neutral region 110.

Preferably, in the variation portion 125 the deflecting effect on the beam components 210 varies according to a specific function of the distance from the neutral region 110, particularly preferably according to a Gaussian function or according to a linear function.

The deflecting region 123 preferably has a phase influencing structure 126, which is constant in the constant portion 123 and varies in the variation portion 125. Particularly preferably, the spatial frequency filter device 110 exclusively influences the phase, but does not influence the intensity or amplitude of the laser beam 200. This has the advantage that the laser beam 200 ultimately has the same intensity distribution—apart from the filtered, undesired beam components 210—downstream of the spatial frequency filter device 100 in the direction of beam propagation as upstream of the spatial frequency filter device 100.

The phase influencing structure 126 is preferably formed as a diffractive deflecting structure 127, the diffractive deflecting structure 127 having a modulation period g, and consequently being periodic, while in the constant portion 123 it has a constant modulation amplitude a. In the variation portion 125, on the other hand, the modulation amplitude a of the diffractive deflecting structure 127 varies. Preferably, the modulation amplitude a varies in the variation portion 125 according to a specific function of the distance from the neutral region 110, in particular according to a Gaussian function or according to a linear function.

The diffractive deflecting structure 127 may be formed in particular as a geometric grating, or be formed by a local, in particular spatial, variation of a refractive index.

The spatial frequency filter device 100 preferably has a filter body 130, on which the neutral region 110 is formed. The deflecting region 120 is preferably applied to the filter body 130 or incorporated in the filter body 130.

Also indicated in FIG. 2 is a neutral width dimension NB, which the neutral region 110 has. In this case, the neutral width dimension NB here is preferably a radius of the neutral region 110.

The spatial frequency filter device 100 is preferably formed as a transmission stop, as a lens, as a protective glass, as a fiber end cap or as a mirror. In particular, the spatial frequency filter device 100 may also be integrated in a resonator of a laser producing the laser beam 200, be arranged downstream of the resonator, or be arranged upstream or in a processing optical unit. It is however also possible that the spatial frequency filter device 100 is formed as a separate element.

The diffractive deflecting structure 127 is preferably formed such that it does not produce a diffraction of zero order. Preferably, the diffractive deflecting structure 127 is formed such that it explicitly produces a diffraction of the first order, in particular no higher diffraction orders. According to a preferred configuration, the diffractive deflecting structure 127 is formed as a blazed grating 129, or it has a blazed grating 129.

According to a preferred configuration, the diffractive deflecting structure 127 is etched into the filter body 130 or is incorporated in the filter body 130 as a volume modification, in particular as a volume grating.

Figure 3:
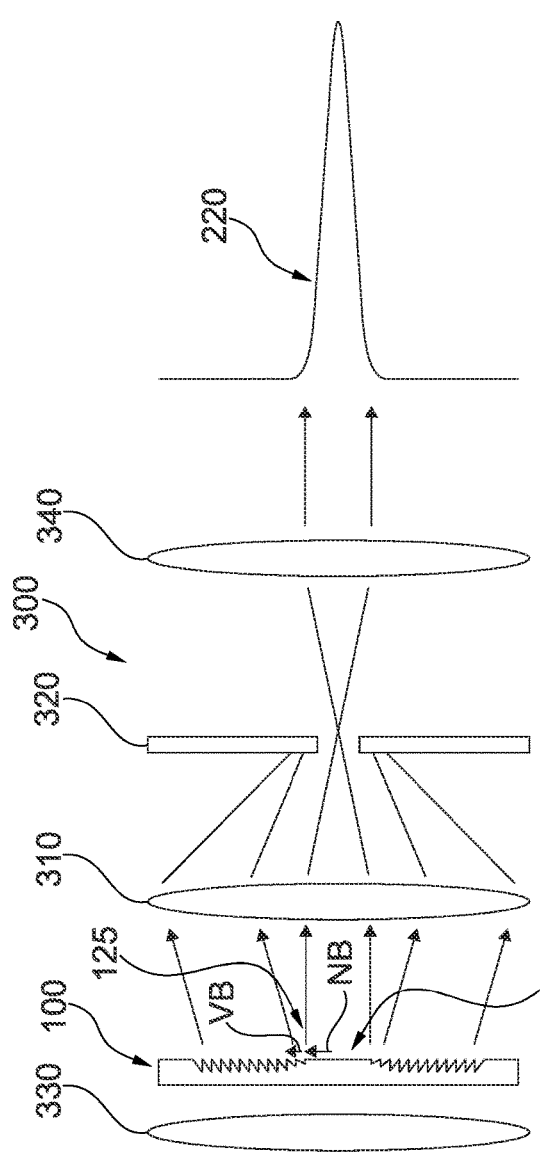
FIG. 3 shows a schematic representation of a first exemplary embodiment of a spatial frequency filter assembly.

FIG. 3 shows a schematic representation of a first exemplary embodiment of a spatial frequency filter assembly 300 for the laser beam 200, the spatial frequency filter assembly 300 having a spatial frequency filter device 100 that coincides with the technical teaching disclosed here. It is shown here in this case on the spatial frequency filter device 100 that the variation portion 125 has a variation width dimension VB, which is preferably a ring width of the annular variation portion 125, with which the annular variation portion 125 surrounds the neutral region 110 in the form of a ring.

Also schematically shown in FIG. 3 is a beam width dimension SB of the laser beam 200, which is likewise formed as a half width dimension, here as a beam radius, with specifically twice the beam width dimension being shown in FIG. 3 as the diameter of the laser beam 200. In the case of the laser beam 200 shown here by way of example as Gaussian-shaped, the beam width dimension is preferably determined at a fraction of $1/e^2$ of a maximum intensity.

The neutral width dimension NB is preferably from at least 5% to at most 130% of the beam width dimension SB. The variation width dimension VB of the variation portion 125 is alternatively or additionally preferably from at least 10% to at most 150% of the neutral width dimension NB.

FIG. 3 schematically shows a situation in which the undesired beam components 210 are at a comparatively great distance from the beam axis A and at the same time from the main beam or used beam, and so they can be filtered out comparatively easily. In such a case, the neutral width dimension NB is preferably from at least 60% to at most 100% of the beam width dimension SB. The variation width dimension VB is preferably from at least 10% to at most 40%, preferably 30%, of the neutral width dimension NB.

Figure 4:
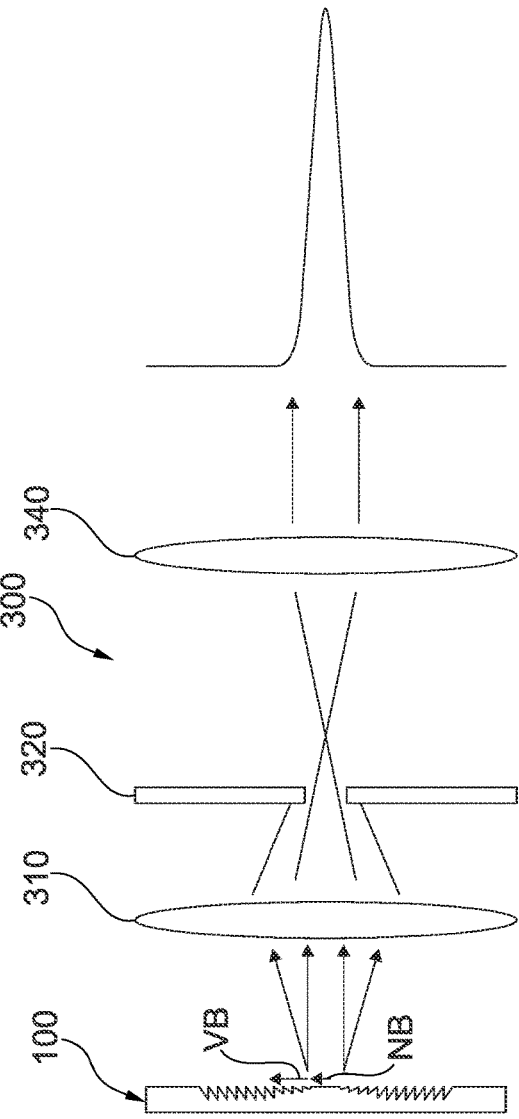
FIG. 4 shows a schematic representation of a second exemplary embodiment of a spatial frequency filter assembly.

Reference should already be made here to FIG. 4, where—irrespective of the otherwise different configuration of the second exemplary embodiment of the spatial frequency filter assembly 300 shown there—a situation is shown in which the undesired beam components 210 overlap with the main beam or used beam, and consequently are arranged closer to the beam axis A than according to the situation that is shown in FIG. 3. In this case, the undesired beam components are more difficult to filter. The neutral width dimension NB is in this case preferably chosen as at least 20% to at most 60% of the beam width dimension SB. The variation width dimension VB is in this case preferably from at least 40% to at most 150%, preferably 100%, of the neutral width dimension NB.

Returning to FIG. 3, the spatial frequency filter assembly 300 shown there has the constant filter device 320 downstream of the spatial frequency filter device 100 in the direction of beam propagation of the laser beam 200—in particular spaced apart at a specific propagation distance from it. It also has a first converging lens 310, which is arranged downstream of the spatial frequency filter device 100. Furthermore, here the first converging lens 310 is arranged upstream of the constant filter device 320. It is alternatively also possible that the constant filter device 320 is integrated in the first converging lens 310 or is arranged on the first converging lens 310. Undesired beam components deflected by the deflecting region 120 are eliminated, in particular absorbed, by the constant filter device 320 after they have traveled the specific propagation distance. In this way, in particular amplitude filtering for the laser beam 200 is realized.

The spatial frequency filter assembly 300 according to the first exemplary embodiment as shown in FIG. 3 also has a second converging lens 330, which is arranged upstream of the spatial frequency filter device 100 in the direction of beam propagation of the laser beam 200. This proves to be advantageous in particular if the laser beam 200 has a very small beam width dimension SB, in particular is coupled out from a fiber bundle 10, while it can then be expanded by the second converging lens 330, and so the spatial frequency filter device 100 can have a greater structure size, in particular a greater modulation period g and/or a greater modulation amplitude a than would be the case if the laser beam 200 were not expanded. Generally, the beam width dimension SB can be adapted to an outside diameter of the spatial frequency filter device 100, in particular made smaller or larger, by means of the second converging lens 330. This also proves to be advantageous if the beam width dimension SB is greater than the outside diameter of the spatial frequency filter device 100.

In the case of the first exemplary embodiment shown here, the spatial frequency filter assembly 300 also has a third converging lens 340, which is arranged downstream of the constant filter device 320 in the direction of beam propagation of the laser beam 200. This lens can be advantageously used in particular to collimate the filtered laser beam. This results in a filtered, collimated laser beam 220 downstream of the spatial frequency filter assembly 300. It is schematically shown here that this filtered, collimated laser beam 220 no longer has the undesired beam components 210.

In FIGS. 3 and 4, the laser beam 200 propagates in each case from left to right through the spatial frequency filter assemblies 300.

FIG. 4 shows a schematic representation of a second exemplary embodiment of a spatial frequency filter assembly 300. In this case, the second exemplary embodiment shown here does not have the second converging lens 330. However, it is also possible in the case of this second exemplary embodiment that such a second converging lens 330 is used.

Preferably, the spatial frequency filter device 100 is formed according to a so-called 4f arrangement, wherein the spatial frequency filter device 100 and the constant filter device 320 are respectively arranged at the focal positions on both sides of the first converging lens 310, while furthermore the constant filter device 320 is preferably arranged at the focus of the third converging lens 340.

In the case of the first exemplary embodiment according to FIG. 3, the spatial frequency filter device 100 is additionally arranged at the focus of the second converging lens 330. However, this is not necessarily the case, but rather an arrangement outside the focus is also possible, in particular in order to adapt the beam width dimension SB to the outside diameter of the spatial frequency filter device 100.

According to a preferred configuration, the focuses of the various converging lenses 310, 330, 340 are formed identically, but may also be chosen to be different in pairs, or all different from one another.

The laser beam 200 is preferably filtered, in that the neutral region 110 of the spatial frequency filter device 100 is passed through by the laser beam 200, or in that the laser beam 200 is reflected by the neutral region 110. In this case, the undesired beam components 210 are deflected from the beam axis A in the deflecting region 120 radially adjoining the neutral region 110, the beam components 210 being deflected in the constant portion 123 with a constant deflecting effect independently of the distance from the neutral region 110, while the beam components 210 are deflected in the variation portion 125 with a varying deflecting effect, in particular with a deflecting effect that increases with increasing distance from the neutral region 110, in dependence on the distance from the neutral region 110.

The deflecting angle θ of the deflecting region 120 is preferably obtained as the arc sine of the quotient of the radiated-in wavelength λ of the laser beam 200 on the one hand and the modulation period g of the deflecting region 120 on the other hand, in particular in accordance with equation (1) specified above. In approximation, the deflecting angle θ is preferably obtained as the quotient of the radiated-in wavelength λ divided by the modulation period g, in particular in accordance with equation (2) specified above.

In a plane to which the beam axis A is perpendicular, the neutral region 110 is preferably geometrically formed as corresponding at least to the ideal beam geometry of the laser beam 200, in particular as circular for a cylindrically symmetrical laser beam 200. It may however also be formed as rectangular—in particular for a rectangular laser beam cross section—or elliptical—in particular for an elliptical laser beam cross section. The deflecting region 120, in particular both the constant portion 123 and the the variation portion 125, are preferably formed like the neutral region 110 and surround the latter radially outside, in particular as correspondingly formed peripheral regions.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A spatial frequency filter device for use with a laser beam, the spatial frequency filter device comprising:
   a neutral region, which is configured to transmit or reflect the laser beam; and
   a deflecting region, which radially adjoins the neutral region and is configured to deflect beam components of the laser beam from a beam axis of the laser beam,
   wherein the deflecting region has a constant portion, in which a deflecting effect on the beam components of the laser beam for each location in the constant portion is configured to be independent of a distance of a location from the neutral region, and
   wherein the deflecting region has a variation portion, in which the deflecting effect on the beam components of the laser beam is configured to vary, dependent on a distance from the neutral region.

2. The spatial frequency filter device as claimed in claim 1, wherein the neutral region is arranged centrally and is surrounded by the deflecting region on an outside, the variation portion being arranged between the neutral region and the constant portion.

3. The spatial frequency filter device as claimed in claim 1, wherein in the variation portion the deflecting effect on the beam components of the laser beam is configured to increase with increasing distance from the neutral region.

4. The spatial frequency filter device as claimed in claim 1, wherein the deflecting region has a phase influencing structure.

5. The spatial frequency filter device as claimed in claim 1, wherein the phase influencing structure is formed as a diffractive deflecting structure, the diffractive deflecting structure being periodic and having in the constant portion a constant modulation amplitude, the modulation amplitude of the diffractive deflecting structure varying in the variation portion.

6. The spatial frequency filter device as claimed in claim 1, wherein the deflecting effect on the beam components of the laser beam is configured to vary according to a specific function of the distance from the neutral region.

7. The spatial frequency filter device as claimed in claim 1, wherein the spatial frequency filter device has a filter body, on which the neutral region has been formed, the deflecting region having been applied to the filter body or incorporated in the filter body.

8. The spatial frequency filter device as claimed in claim 1, wherein the neutral region has a neutral width dimension, wherein:
   a) the neutral width dimension is from at least 5% to at most 130%, of a beam width dimension of a laser beam to be filtered, or
   b) a variation width dimension of the variation portion is from at least 10% to at most 150 of the neutral width dimension.

9. The spatial frequency filter device as claimed in claim 1, wherein the spatial frequency filter device is formed as a transmission stop, as a lens, as a protective glass, as a fiber end cap, or as a mirror.

10. The spatial frequency filter device as claimed in claim 1, wherein the diffractive deflecting structure has been etched into the filter body, or has been incorporated in the filter body as a volume modification.

11. A spatial frequency filter assembly for the laser beam, having the spatial frequency filter device as claimed in claim 1, and having a constant filter device.

12. The spatial frequency filter assembly as claimed in claim 11, comprising a first converging lens, which is arranged downstream of the spatial frequency filter device in a direction of beam propagation of the laser beam.

13. The spatial frequency filter assembly as claimed in claim 11, comprising a second converging lens, which is arranged upstream of the spatial frequency filter device in a direction of beam propagation of the laser beam.

14. A method for spatial frequency filtering of a laser beam, the method comprising:
   a) passing the laser beam through a neutral region of a spatial frequency filter device; or
   b) reflecting the laser beam by the neutral region of the spatial frequency filter device; wherein
   beam components of the laser beam are deflected from a beam axis of the laser beam in a deflecting region radially adjoining the neutral region,
   wherein in a constant portion of the deflecting region, the beam components are deflected with a constant deflecting effect independently of a distance from the neutral region, and
   wherein in a variation portion of the deflecting region, the beam components are deflected with a varying deflecting effect in dependence on a distance from the neutral region.

15. The method as claimed in claim 14, wherein the deflecting region has a diffractive deflecting structure, a zero diffraction order being suppressed by the diffractive deflecting structure.

16. The spatial frequency filter device as claimed in claim 1, wherein the deflecting effect on the beam components of the laser beam is configured to vary according to a Gaussian function or according to a linear function.

* * * * *